C. E. HENRIOD.
TRANSMISSION GEARING.
APPLICATION FILED AUG. 28, 1908.

978,159.

Patented Dec. 13, 1910.
3 SHEETS—SHEET 1.

WITNESSES
Joseph E. Cavanaugh
Josephine Weyl

INVENTOR
Charles Edouard Henriod
BY
Max D. Ordmann
ATTORNEYS

C. E. HENRIOD.
TRANSMISSION GEARING.
APPLICATION FILED AUG. 28, 1908.

978,159.

Patented Dec. 13, 1910.

3 SHEETS—SHEET 2.

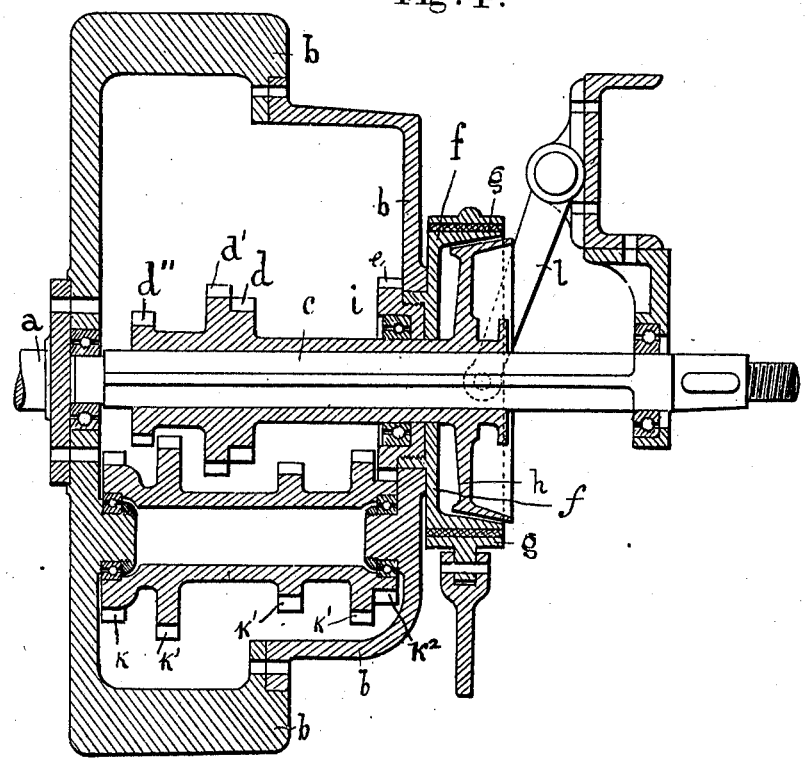

UNITED STATES PATENT OFFICE.

CHARLES EDOUARD HENRIOD, OF NEUILLY, FRANCE.

TRANSMISSION-GEARING.

978,159.  Specification of Letters Patent.  Patented Dec. 13, 1910.

Application filed August 28, 1908. Serial No. 450,717.

*To all whom it may concern:*

Be it known that I, CHARLES EDOUARD HENRIOD, a citizen of the Republic of France, residing at Neuilly, Seine, France, have invented certain new and useful Improvements in Transmission - Gearing, of which the following is a specification.

The present invention pertains to fly wheels of the same type as the ones described in my application No. 411,124 of January 16, 1908, and particularly to an improvement which consists in that the fly wheel is made as a single body, the gears being operated from the outside of the fly wheel, as will be hereinafter fully specified.

To make my invention more clear the same is illustrated in the accompanying drawings, in which—

Figure 1:
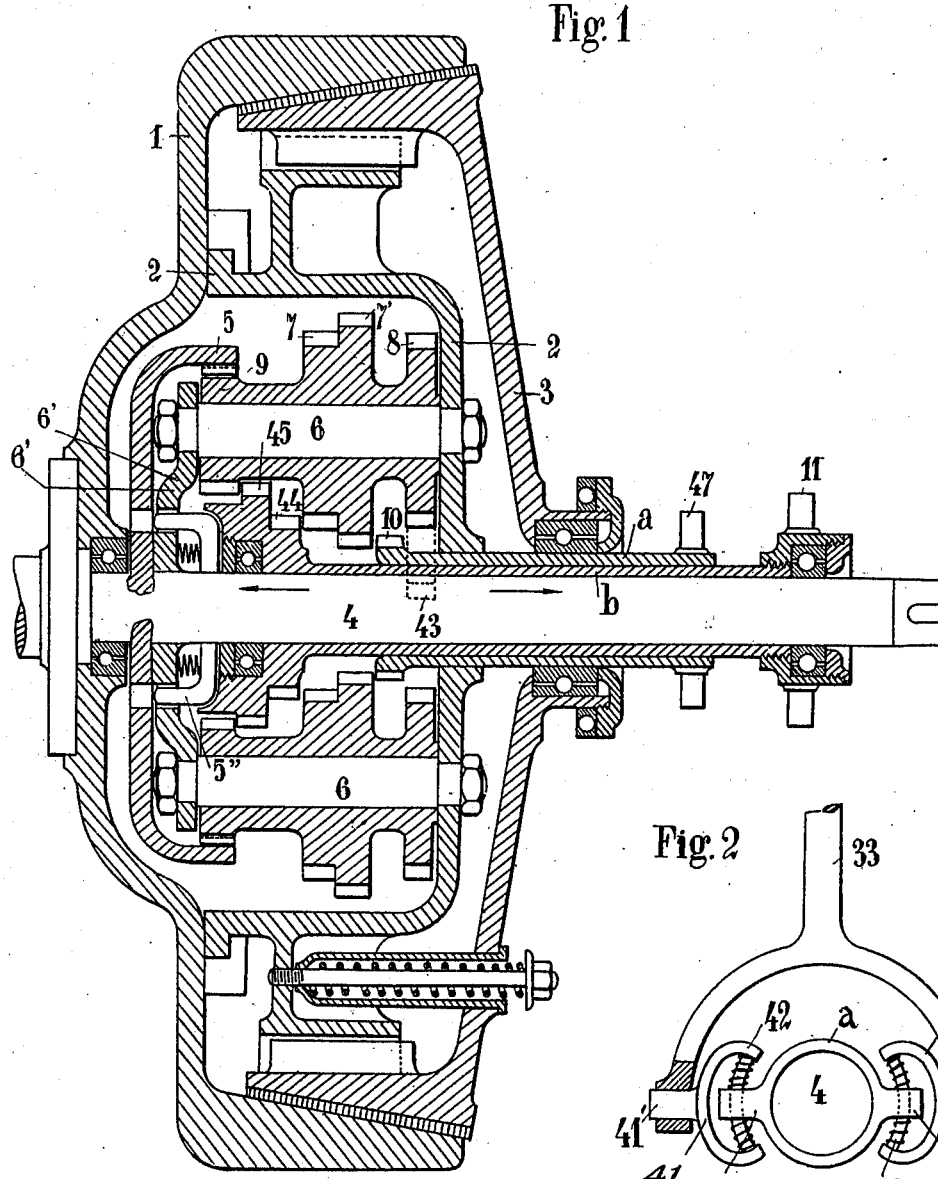
Figure 2:
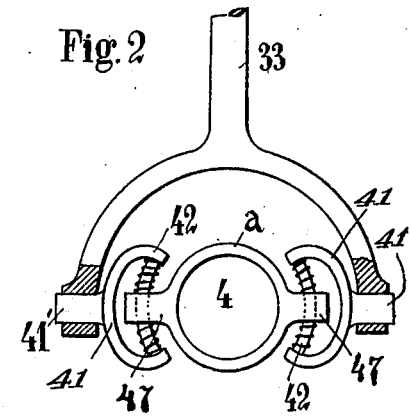
Figure 3:
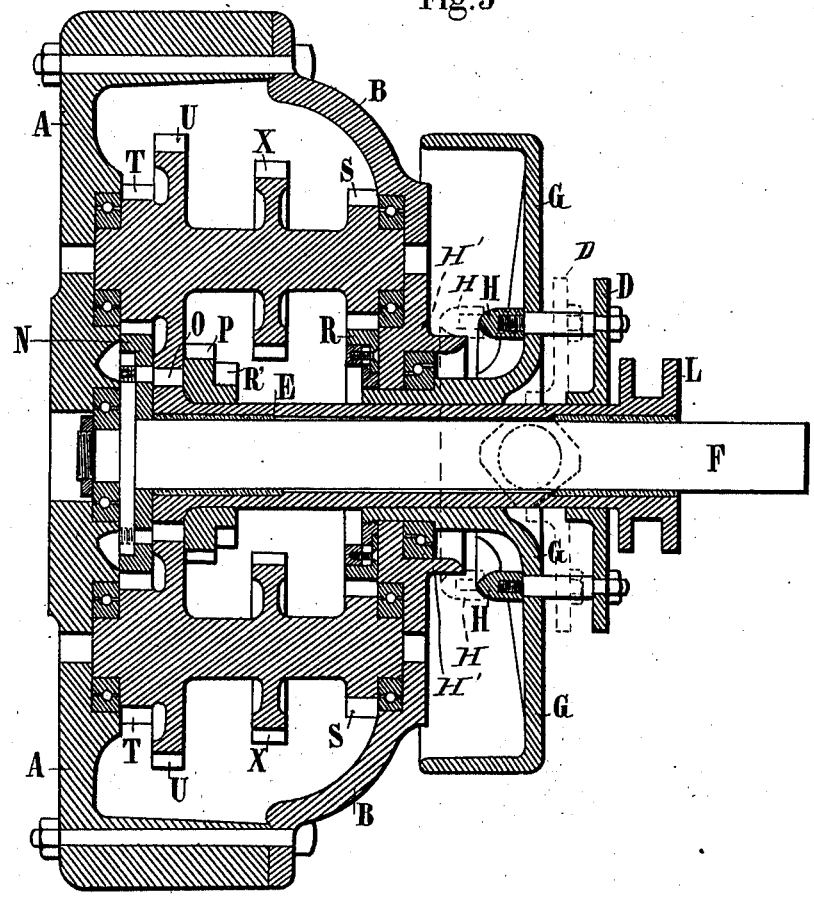

Figure 1 is a longitudinal section of the fly wheel; Fig. 2 a detail, and Figs. 3 and 4 are longitudinal sections of two modifications.

The fly wheel shown in Fig. 1 consists of the parts 1 and 2, of which 1 is secured to the driving shaft. The second part 2 is coupled with the part 1 by means of the clutch cone 3.

4 is the central shaft to be driven, which may transmit movement to a vehicle, vessel or any other machine, and upon which a toothed crown 5 is rigidly secured. Journaled in the part 2 of the fly wheel and in a disk 6' loosely mounted on the shaft 4 are spindles 6, which carry idle satellite wheels 7, 7', 8 and 9 of variable diameter. Slidably mounted upon the central shaft 4 are sockets $a$ and $b$, of which $a$ carries a toothed wheel 10 that according to its displacement to the left or right is adapted to engage either directly with the wheels 7' (for the forward drive), or indirectly by means of intermediate wheels 43 (marked by dotted lines), with the wheels 8 of the satellite systems (for the reverse drive). The socket $b$ carries the toothed wheels 44 and 45 which are solid with each other and which according to their displacement will respectively engage the wheel 7 or the wheel 9. The displacement of the sleeves $a$ and $b$ is accomplished by bifurcated levers 33 (Fig. 2) which engage pins 47 and 11, provided on the outer ends of the sockets $a$ and $b$.

For the purpose hereinafter to be explained between the manipulating levers 33 and the sockets $a$ and $b$ a suitable buffer mechanism is arranged. In the present example the buffer mechanism consists of springs 42 that are carried by forks 41 and that are suitably engaged with the said pins 47 and 11, respectively. The forks 41 are provided with pins 41' for engagement with the levers 33.

The operation of this mechanism is as follows: When, for instance, the sleeve $a$ is so displaced that its wheel 10 is brought into engagement with the wheel 7, the springs 42 will permit the latter to yield and to be carried around so long until the springs 42 are sufficiently compressed, *i. e.* that their resisting power is higher than that of the vehicle to be started. At this moment the wheel 10 will be arrested and cause the satellite wheels to revolve around themselves, whereby the latter will transmit their rotation movement to the shaft 4 by the wheels 9 and the crown 5. Likewise, in order to change from one speed to the other, the buffers 42 will allow the sockets $a$ and $b$ and their respective wheels to be carried around at a certain angle, until they will become automatically arrested, whereupon the transmission of movement to the shaft 4 will be begun.

With the construction described in the application 411,124 referred to above, it is necessary before the shaft 4 can be started to run with a certain speed or each time a change of the speed thereof is desired, to first release the parts 1 and 2 of the fly wheel, by shifting the clutch cone 3 out of its operating position. For, when the parts 1 and 2 remain coupled, the part 2 will be carried along by part 1 with the full speed of the motor. As the satellite systems are borne in the section 2 of the fly wheel, the same will consequently also revolve around the shaft 4 with the full speed of the motor. Supposing now that the sockets $a$ and $b$ are non-rotary, as in the construction of the application referred to, then when either of the sockets $a$ or $b$ is displaced, so as to bring the wheel 10 or wheels 44 or 45 in engagement with the satellite systems to start the shaft 4 or to change its speed, it is clear that without previously releasing the sections 1 and 2 of the flywheel, such sudden engagement of the non-rotary central wheels with the satellite wheels that are revolving with the full speed of the motor would cause some breakage in the gears.

The object of the above-described buffer mechanism is to allow of the displacement of the central wheels at any time without the necessity of uncoupling the parts 1 and 2 of the fly wheel. In other words, the buffers permit of the parts 1 and 2 of the fly wheel remaining permanently coupled, while the central wheels are manipulated to control the rotation movement of the satellite wheels. Hence the friction clutch 3, in the present case, has no more its original function, viz: to temporarily couple the parts 1 and 2, but merely to secure parts 1 and 2 together, as it could be accomplished by any other means, as by bolts or the like.

Fig. 3 shows a modification of the above system in which the springs are replaced by a friction mechanism. The fly wheel here allows three changes of speed and a reverse movement. In this figure A and B denote the parts of the fly wheel which are permanently connected with one another to form one piece which is directly operated from the motor shaft (not shown). F is the shaft to be driven in the two directions. Between the parts A and B of the fly wheel are mounted the systems of satellite wheels T, U, X and S and around the shaft F the slidable socket E which carries coupling wheels O, P and the clutch R'. G is a drum mounted with its nave on the square outer surface of the slidable socket E which on its outside carries a brake and the slip of the brake element accomplishes the same result as the buffer springs shown in Fig. 2. D is a disk loosely slidable on the socket E and adapted to operate the conical ring H which when displaced to the left, as shown by dotted lines, until it contacts with the collar H' of the fly wheel B, will lock the drum G with the latter, so that the whole will form but one piece. The shaft F will then revolve with the speed of the motor. It is understood that for intermediate speeds the rotation movement of the satellite wheels around themselves is transmitted to the shaft F by the wheels T and N, the latter being keyed to the shaft F.

In order to understand the function of the reverse movement it is necessary to indicate the number of teeth of each of the gears, since on this alone depends the movement of the shaft F in the two directions. Supposing that wheel O has seventeen teeth and the satellite wheel U twenty-five teeth, it will be understood that during one revolution of the fly wheel, the wheel U does not make a full revolution around itself because it has more teeth than the wheel O. This fraction of rotation of the satellite wheel U is communicated to the shaft F by the wheel T that is rigid with wheel U and the wheel N keyed on the shaft F. Supposing that N has twenty-eight teeth and T fourteen teeth, then, for example, with ten revolutions of the fly wheel the central shaft would make three and two-fifths revolutions. If, following this principle, it is supposed that the clutch wheel O has also twenty-eight teeth and U fourteen, the same ratio as exists between N and T will be received but in the reverse sense and N will become immovable. If it is again supposed that O has twenty-nine teeth and U thirteen teeth, it follows that U during one revolution of the fly wheel will make more than one revolution around itself and around O, and consequently, will find itself before the point of immobilization of N, hence N will revolve in the reverse direction. It is clear, as the drawing shows, that the gear S of thirteen teeth, taking its planetary movement upon the gear R of twenty-nine teeth, will upon the displacement to the right of the gear R' that is solid with the gear P, and upon the engagement of said gear R' with the gear R, receive a rotation in a different direction than that which the gear X receives when in engagement with the gear P (low speed), or the gear O when in engagement with the gear U (high speed).

Fig. 4 shows a second modification. $a$ is the motor shaft upon which the fly wheel is fixed. $b$ is the body of the fly wheel; $c$ the shaft to be driven; $d$, $d'$, $d''$ are three gears of different diameters slidably mounted on the central shaft $c$ keyed upon it. $e$ is a gear which at will can be rendered immovable, and which, according to the sense of rotation desired, may be provided with teeth either within or without. $f$ is a drum or disk which is keyed upon the wheel $e$; $g$ is a brake for the immobilization of the wheel $e$. $h$ is a conical disk which by the nave or socket $i$ of the gears $d$, $d'$, $d''$ is keyed to the central shaft $c$ and which can also be locked with the wheel $e$ by the disk $f$. $k$, $k'$, $k'$, $k'$, $k^2$ are satellite wheels of variable diameters journaled in the body of the fly wheel $b$, and $l$ is a lever pivoted to the frame of the vehicle and connected with the sleeve $i$, so that by its operation the latter can be displaced to bring any one of the wheels $d$, $d'$ and $d''$ in meshing connection with the system of wheels $k'$, $k'$, $k'$.

The mode of operation of this apparatus is as follows: Supposing that the motor runs with a constant speed and the gear $e$ is free, then the central shaft receives no movement. When the gear $e$ is rendered immovable by the brake $g$ the satellite gears will receive a rotary movement around themselves by the gear $k^2$ that meshes with the gear $e$. When one of the system of the wheels $d'$ $d''$ is brought in meshing connection with the system of the satellite gears, the former system will receive the rotary movement in the reverse direction to that of the motor. When it is desired to change the traveling direction the gear $d$ is put in meshing connection with the gears $k'$ by means of an intermediary gear (not shown).

What I claim and desire to secure by Letters Patent is:—

1. In a transmission gearing, the combination with a driving shaft and a driven shaft, of a fly wheel, the satellite wheels of variable diameter borne in said fly wheel, wheels loosely and slidably mounted on the driven shaft, the speed of the satellite wheels varying under the action of the slidable wheels, a gear on the driven shaft constantly meshing with one of the satellite gears, and a buffer mechanism for said slidable wheels which will permit the latter to sufficiently yield under the action of the satellite wheels, and thereupon to become arrested, substantially as and for the purpose specified.

2. In a transmission gearing, the combination with a driving shaft and a driven shaft, of a fly wheel, the satellite wheels of variable diameter borne in said fly wheel, wheels loosely and slidably mounted on the driven shaft, the speed of the satellite wheels varying under the action of the slidable wheels, a gear on the driven shaft constantly meshing with one of the satellite gears, a lever mechanism for causing the displacement of the slidable wheels, and buffer springs connecting said lever mechanism with the said slidable wheels, said buffer springs permitting the slidable wheels to yield under the action of the satellite wheels and thereupon to become arrested, substantially as and for the purpose specified.

3. In a transmission mechanism, the combination with a driving shaft and a driven shaft, of a fly wheel, the satellite wheels of variable diameter borne in said fly wheel, sleeves loosely and slidably mounted on the driven shaft, wheels carried by said sleeves, the speed of the satellite wheels varying under the action of the slidable wheels, a gear on the driven shaft constantly meshing with one of the satellite gears, and a buffer mechanism for said slidable wheels which permit of the latter to sufficiently yield under the action of the satellite wheels, and thereupon to become arrested, substantially as and for the purpose specified.

In testimony whereof I affix my signature in presence of two witnesses.

CHARLES EDOUARD HENRIOD.

Witnesses:
GASTON DEMOGET,
HANSON C. COXE.